(12) United States Patent
Shiraishi et al.

(10) Patent No.: US 11,705,789 B2
(45) Date of Patent: Jul. 18, 2023

(54) MOTOR AND BLOWER

(71) Applicant: Nidec Corporation, Kyoto (JP)

(72) Inventors: Yukinobu Shiraishi, Kyoto (JP); Takashi Uchino, Kyoto (JP); Tsuyoshi Yasumura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 314 days.

(21) Appl. No.: 17/031,992

(22) Filed: Sep. 25, 2020

(65) Prior Publication Data

US 2021/0099057 A1    Apr. 1, 2021

(30) Foreign Application Priority Data

Sep. 26, 2019  (JP) .................................. 2019-176170
Aug. 31, 2020  (JP) .................................. 2020-145423

(51) Int. Cl.
| | |
|---|---|
| *H02K 11/33* | (2016.01) |
| *H02K 7/14* | (2006.01) |
| *F04D 29/28* | (2006.01) |
| *H02K 21/22* | (2006.01) |
| *F04D 25/06* | (2006.01) |

(52) U.S. Cl.
CPC ........... *H02K 11/33* (2016.01); *F04D 29/281* (2013.01); *H02K 7/14* (2013.01); *H02K 21/22* (2013.01); *F04D 25/06* (2013.01); *H02K 2211/03* (2013.01)

(58) Field of Classification Search
CPC .......... H02K 11/33; H02K 3/522; H02K 7/14; H02K 21/22; H02K 2211/03; H02K 11/00; H02K 11/04; H02K 11/046; H02K 11/048; H02K 11/049; H02K 11/30; H02K 11/38; F04D 25/068; F04D 25/0606; F04D 29/281; F04D 17/16; F04D 25/06

USPC .......................... 310/68 R, 68 B, 68 C, 68 D
See application file for complete search history.

(56) References Cited

U.S. PATENT DOCUMENTS

| | | | |
|---|---|---|---|
| 2015/0229192 A1* | 8/2015 | Yoshida | ................... H02K 5/08 310/43 |
| 2018/0069457 A1* | 3/2018 | Michishita | ........... H02K 11/215 |
| 2018/0166942 A1* | 6/2018 | Aoi | ........................ H02K 11/33 |

(Continued)

FOREIGN PATENT DOCUMENTS

| | | | |
|---|---|---|---|
| JP | 2009278749 A | * | 11/2009 |
| JP | 2010-022192 A | | 1/2010 |

OTHER PUBLICATIONS

Takada et al, Mold Motor, Nov. 26, 2009, JP 2009278749 (English Machine Translation) (Year: 2009).*

*Primary Examiner* — Alexander A Singh
(74) *Attorney, Agent, or Firm* — Keating & Bennett (57) ABSTRACT

A motor includes a rotating portion rotatable about a center axis that extends vertically and a stationary portion that rotatably supports the rotating portion. The stationary portion includes a stator facing at least a part of the rotating portion in a radial direction, a circuit board disposed axially below the stator, and a resin portion covering at least a part of the stator, and the circuit board. The stator includes a plurality of coils disposed in a circumferential direction. The circuit board includes an axially upper surface mounted with an electric element that is disposed at least at one of positions including a position between two coils of the plurality of coils, adjacent to each other in the circumference direction, and a position below the coil.

12 Claims, 9 Drawing Sheets

(56) References Cited

U.S. PATENT DOCUMENTS

2019/0288582 A1\* 9/2019 Tahara ................... H02K 11/33
2022/0166279 A1\* 5/2022 Shimokawa ........... H02K 21/16

\* cited by examiner

MOTOR AND BLOWER

CROSS REFERENCE TO RELATED APPLICATION

The present application claims priority under 35 U.S.C. § 119 to Japanese Patent Application No. 2019-176170 filed on Sep. 26, 2019 and Japanese Patent Application No. 2020-145423 filed on Aug. 31, 2020, the entire contents of which are hereby incorporated herein by reference.

1. FIELD OF THE INVENTION

The present disclosure relates to a motor and a blower.

2. BACKGROUND

Conventionally, a motor integrally molded with a thermoplastic resin has been known. Such a motor includes, for example, a stator core, a drive coil wound around the stator core, a printed circuit board on which electronic components are mounted, and a stator including the stator core, the drive coil, and the circuit board that are integrally molded with a thermosetting resin having electric insulation and solidified by injection molding.

When an electric element mounted on a circuit board increases in size in a motor integrally molded with a thermoplastic resin, the entire motor tends to increase in size. As the motor increases in size, the amount of resin required for molding increases, and thus, for example, manufacturing costs of the motor may increase.

SUMMARY

A motor according to an example embodiment of the present disclosure includes a rotating portion that rotates about a center axis that extends vertically and a stationary portion that rotatably supports the rotating portion. The stationary portion includes a stator facing at least a part of the rotating portion in a radial direction, a circuit board disposed axially below the stator, and a resin portion covering at least a part of the stator, and the circuit board. The stator includes a plurality of coils disposed in a circumferential direction. The circuit board includes an axially upper surface mounted with an electric element that is disposed at least at one of positions including a position between two coils of the plurality of coils, adjacent to each other in the circumference direction, and a position below the coil.

A blower according to an example embodiment of the present disclosure includes the motor with the above structure, and an impeller that is rotatable together with the rotating portion.

A motor according to an example embodiment of the present disclosure enables reducing the amount of resin used to cover the stator and the circuit board. Additionally, another example embodiment of the present disclosure enables a molded motor to secure strength while reducing an increase in the amount of resin used for molding.

The above and other elements, features, steps, characteristics and advantages of the present disclosure will become more apparent from the following detailed description of the example embodiments with reference to the attached drawings.

DETAILED DESCRIPTION

Figure 7:
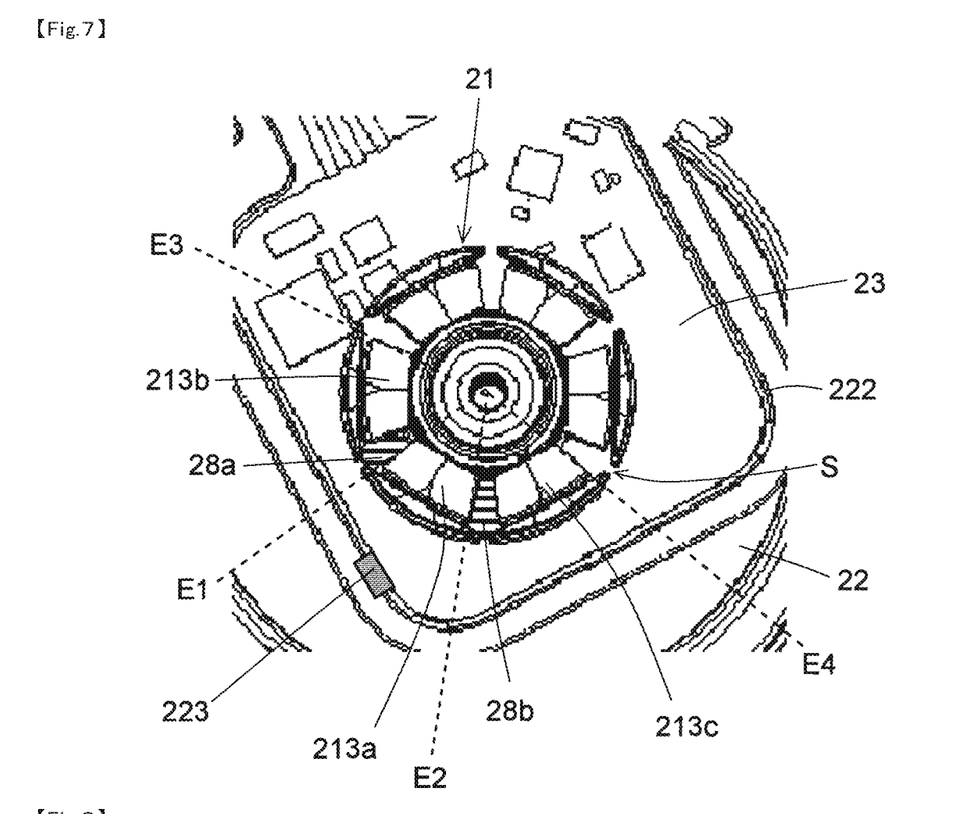
FIG. 7 is a view for illustrating a positional relationship between an injection portion and a coil in the motor according to the first example embodiment of the present disclosure.

Hereinafter, example embodiments of the present disclosure will be described in detail with reference to the drawings. The present specification describes a blower 100 and a motor 1 with directions with respect to a center axis C of the motor 1 illustrated in FIG. 3, the directions including: a direction parallel to the center axis C that is referred to as an "axial direction", "axial", or "axially"; a direction orthogonal to the center axis C that is referred to as a "radial direction", "radial", or "radially"; and a direction along a circular arc about the center axis C that is referred to as a "circumferential direction", "circumferential", or "circumferentially". The present specification also describes a shape and a positional relationship of each part with the axial direction as a vertical direction with a lower side on which a base 22 is provided with respect to a stator 21. However, this definition of the vertical direction does not intend to limit a direction of each of the blower 100 and the motor 1 according to the present disclosure at the time of use. In the present specification, a clockwise side in the circumferential direction in FIG. 7 is referred to as one side in the circumferential direction, and a counterclockwise side in the circumferential direction is referred to as the other side in the circumferential direction. Additionally, an end of a member on one side in the circumferential direction is referred to as one circumferential end, and an end of the member on the other side in the circumferential direction of the member is referred to as the other circumferential end.

Figure 1:
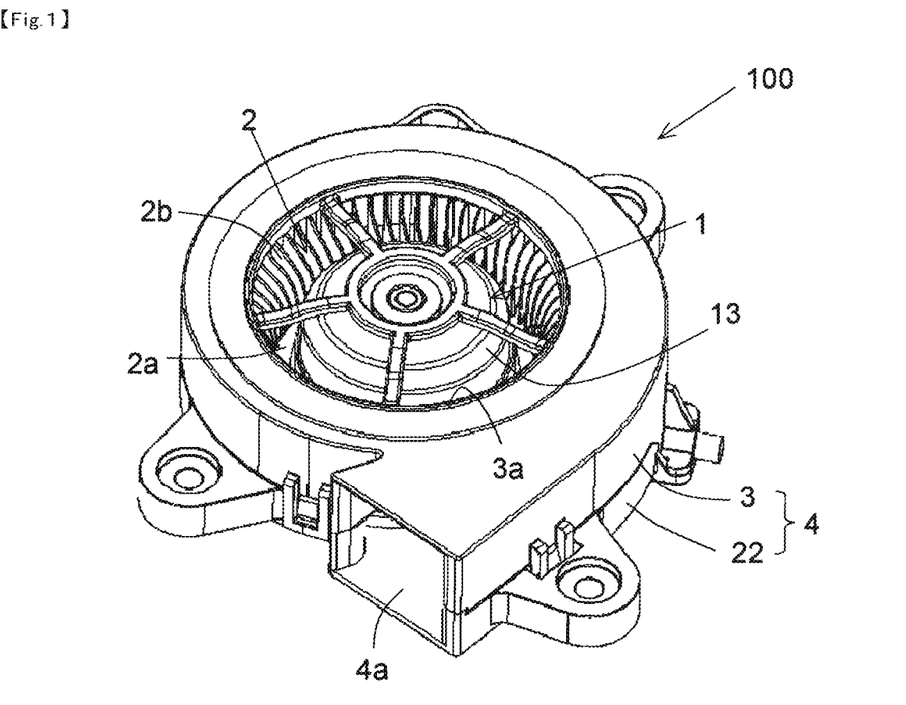
FIG. 1 is a perspective view of a blower according to an example embodiment of the present disclosure.

FIG. 1 is a perspective view of the blower 100 according to an example embodiment of the present disclosure. The blower 100 of the present example embodiment is a centrifugal fan. However, the blower to which the present disclosure is applied is not limited to the centrifugal fan, and may be, for example, an axial fan or a turbo fan. As illustrated in FIG. 1, the blower 100 includes the motor 1 and an impeller 2. The blower 100 further includes a fan cover 3. Details of the motor 1 will be described later.

The impeller 2 is driven by the motor 1 to rotate about the center axis C. The impeller 2 includes an impeller annular portion 2a and a plurality of blade portions 2b. The impeller 2 is made of resin, for example. In the present example embodiment, the impeller annular portion 2a and the plurality of blade portions 2b constitute a single member. However, the impeller annular portion 2a and the plurality of blade portions 2b may be separate members.

The impeller annular portion 2a has an annular shape about the center axis C. The impeller annular portion 2a is attached to a rotating part 10 of the motor 1 described later. That is, the impeller 2 rotates together with the rotating part 10. At least a part of each blade portion 2b is disposed on an axially upper surface of the impeller annular portion 2a. Each blade portion 2b extends from the impeller annular portion 2a in a direction away from the center axis C. The direction away from the center axis C may be parallel to the radial direction or may be a direction inclined with respect to the radial direction. The plurality of blade portions 2b is disposed at intervals in the circumferential direction. In the present example embodiment, the plurality of blade portions 2b is disposed at equal intervals in the circumferential direction.

The fan cover 3 constitutes a housing 4 of the blower 100 in combination with the base 22 of the motor 1 described later. The fan cover 3 is provided with a cover through-hole 3a in a circular shape about the center axis C in plan view in the axial direction, the cover through-hole 3a passing through the fan cover 3 in the axial direction.

The blower 100 is configured such that driving of the motor 1 causes the impeller 2 to rotate to allow airflow to flow into the housing 4 from the outside through the cover through-hole 3a. The airflow having flowed into the housing 4 flows in a direction away from the center axis C along the plurality of blade portions 2b and blows out to the outside from a housing opening 4a provided in the housing 4. The motor 1 can be reduced in axial thickness as described below, so that the blower 100 also can be reduced in axial thickness.

Figure 2:
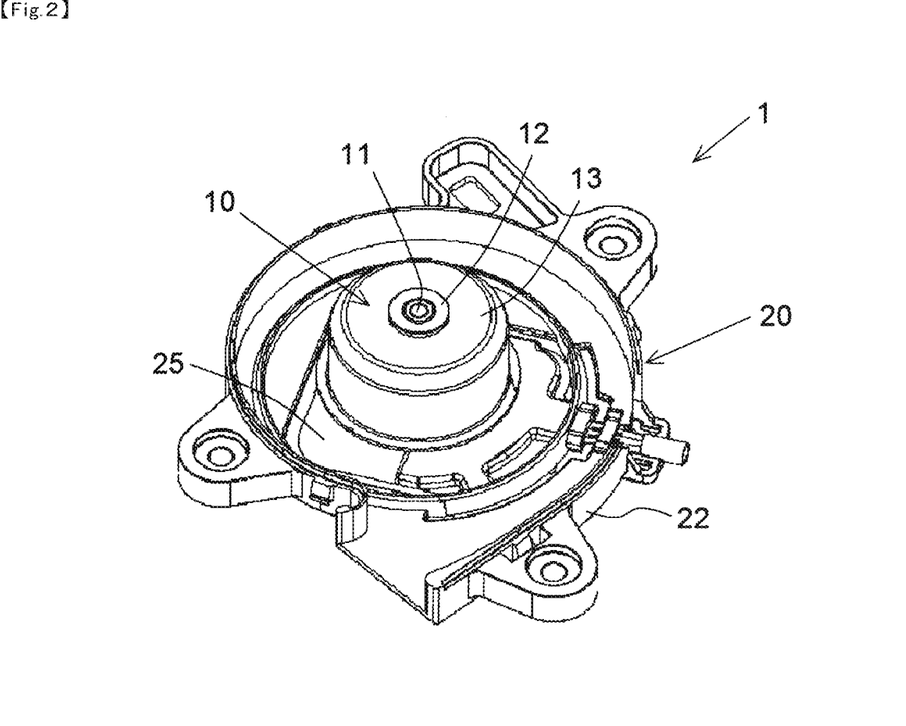
FIG. 2 is a perspective view of a motor according to a first example embodiment of the present disclosure.
Figure 3:
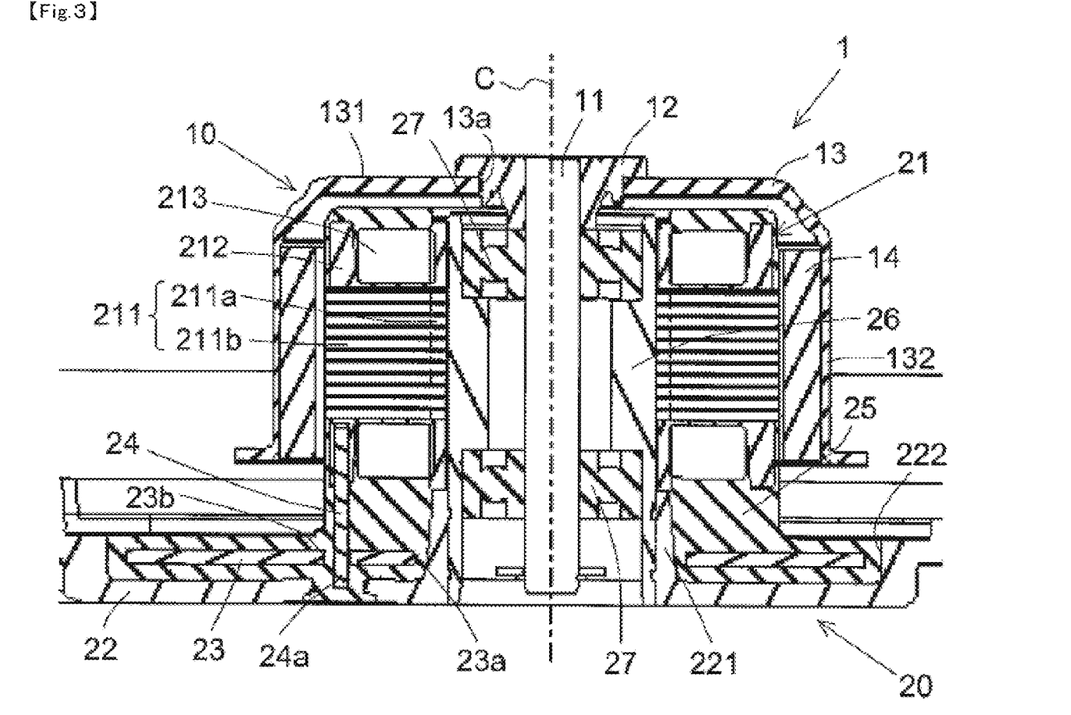
FIG. 3 is a schematic longitudinal sectional view of the motor according to the first example embodiment of the present disclosure.

FIG. 2 is a perspective view of the motor 1 according to the first example embodiment of the present disclosure. FIG. 3 is a schematic longitudinal sectional view of the motor 1 according to the first example embodiment of the present disclosure. As illustrated in FIGS. 2 and 3, the motor 1 includes the rotating part 10 and a stationary part 20.

The rotating part 10 rotates about the center axis C extending vertically. The rotating part 10 includes a rotor holder 13 and a magnet 14. The rotating part 10 further includes a shaft 11 and a bush 12.

The shaft 11 is a columnar member disposed along the center axis C. As a material of the shaft 11, for example, a metal such as stainless steel is used. In the present example embodiment, the shaft 11 rotates about the center axis C. However, the shaft 11 may be configured to be fixed to the base 22 or the like in a non-rotating manner. That is, the rotating part 10 may not include the shaft 11.

The bush 12 has a tubular shape extending in the axial direction. The shaft 11 has an upper end fitted into the bush 12, and the bush 12 is fixed to the upper end of the shaft 11.

The rotor holder 13 opens downward in the axial direction and has a cylindrical shape with a lid. That is, the rotor holder 13 includes an upper wall portion 131. The upper wall portion 131 extends in a direction intersecting the axial direction. The rotor holder 13 further includes a side wall portion 132. The side wall portion 132 extends axially downward from a radially outer end portion of the upper wall portion 131.

The upper wall portion 131 is provided in its central portion with a rotor holder through-hole 13a passing through the upper wall portion 131 in the axial direction. The rotor holder through-hole 13a has a circular shape about the center axis C in plan view in the axial direction. The bush 12 is fitted into the rotor holder through-hole 13a, and the bush 12 is fixed to the rotor holder 13. That is, the rotor holder 13 is provided in a rotatable manner about the center axis C together with the shaft 11.

The rotor holder 13 is fitted in the impeller annular portion 2a, and the impeller 2 is fixed to the rotor holder 13. That is, the impeller 2 rotates with rotation of the rotor holder 13.

The magnet 14 is disposed on the side wall portion 132. Specifically, the magnet 14 is fixed to a radially inner surface of the side wall portion 132. In the present example embodiment, the magnet 14 is a single annular magnet. The magnet 14 has a radially inner surface on which N poles and S poles are alternately disposed in the circumferential direction. However, instead of a single annular magnet, a plurality of magnets may be disposed on the radially inner surface of the side wall portion 132. In this case, the plurality of magnets is disposed in the circumferential direction.

Figure 4:
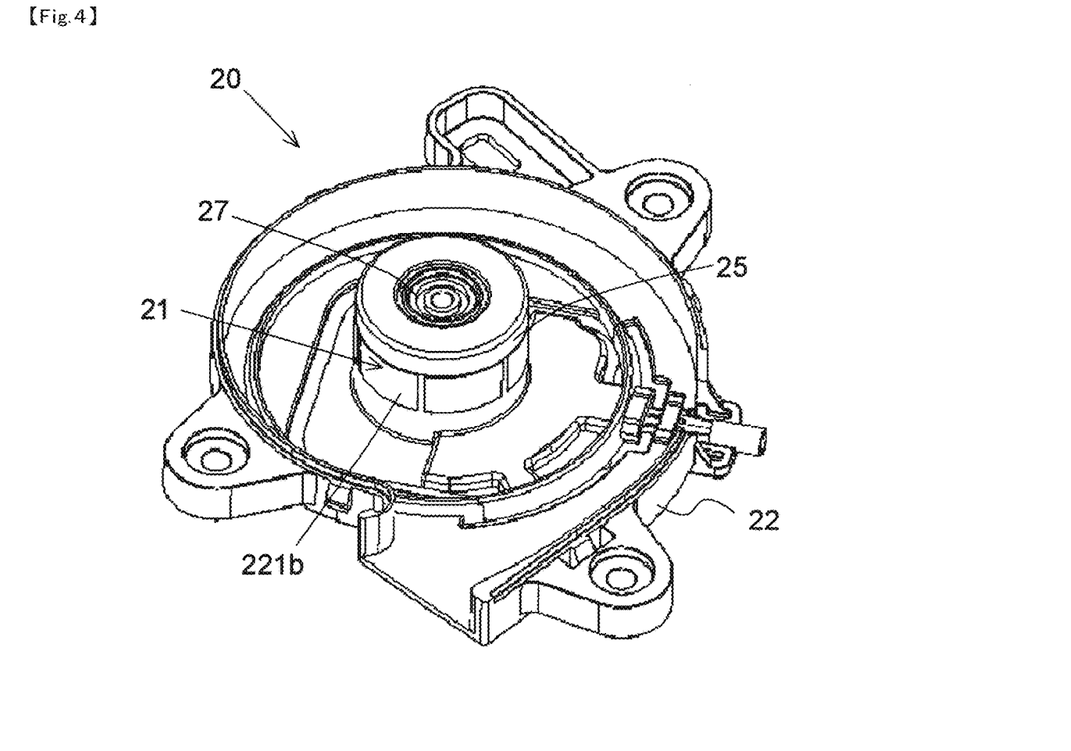
FIG. 4 is a perspective view of a stationary part included in the motor according to the first example embodiment of the present disclosure.

The stationary part 20 rotatably supports the rotating part 10. FIG. 4 is a perspective view of the stationary part 20 included in the motor 1 according to the first example embodiment of the present disclosure. FIG. 4 is a view in which the rotating part 10 is removed from the motor 1 illustrated in FIG. 2. FIG. is a view in which a resin portion 25 is removed from the stationary part 20 illustrated in FIG. 4. However, FIG. 5 differs from FIG. 4 in angle at which the motor 1 is viewed. As illustrated in FIGS. 2 to 5, the stationary part 20 includes the stator 21, the circuit board 23, and a resin portion 25. The stationary part 20 further includes the base 22, a conductive member 24, a bearing holder 26, and a bearing 27.

Figure 5:
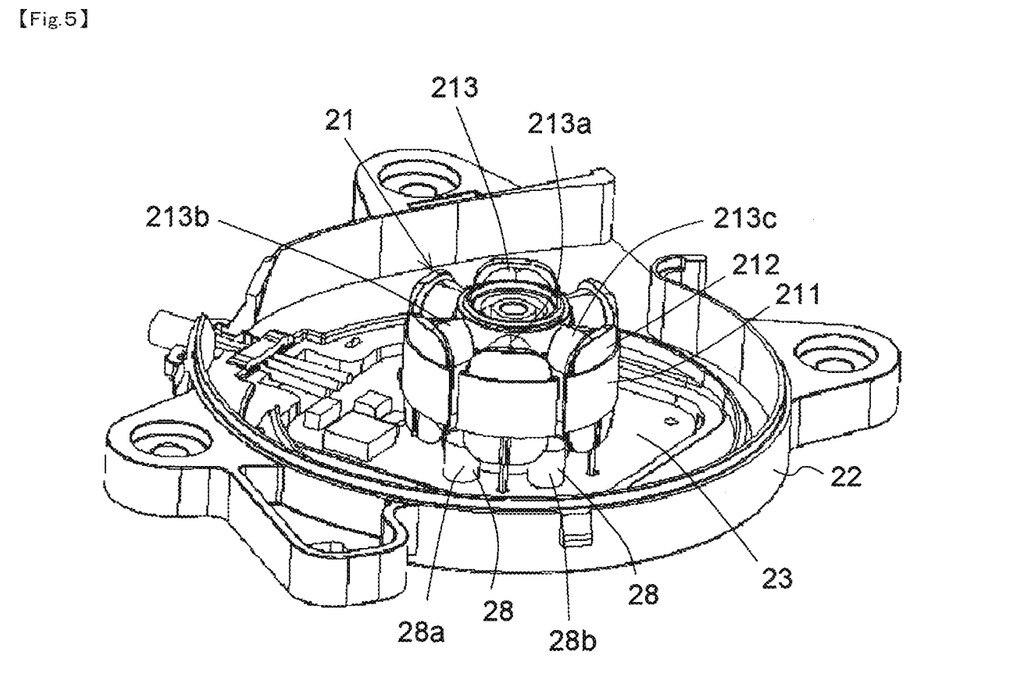
FIG. 5 is a view in which a resin portion is removed from the stationary part illustrated in FIG. 4.

The stator 21 is an armature that generates a magnetic flux in accordance with a drive current. The stator 21 faces at least a part of the rotating part 10 in the radial direction. In the present example embodiment, the stator 21 faces a part of the rotating part 10 in the radial direction. The stator 21 is disposed radially inward of a part of the rotating part 10. The rotor holder 13 includes a side wall portion 132 radially outside the stator 21. Specifically, the stator 21 includes a stator core 211, an insulator 212, and a coil 213.

Figure 5A:
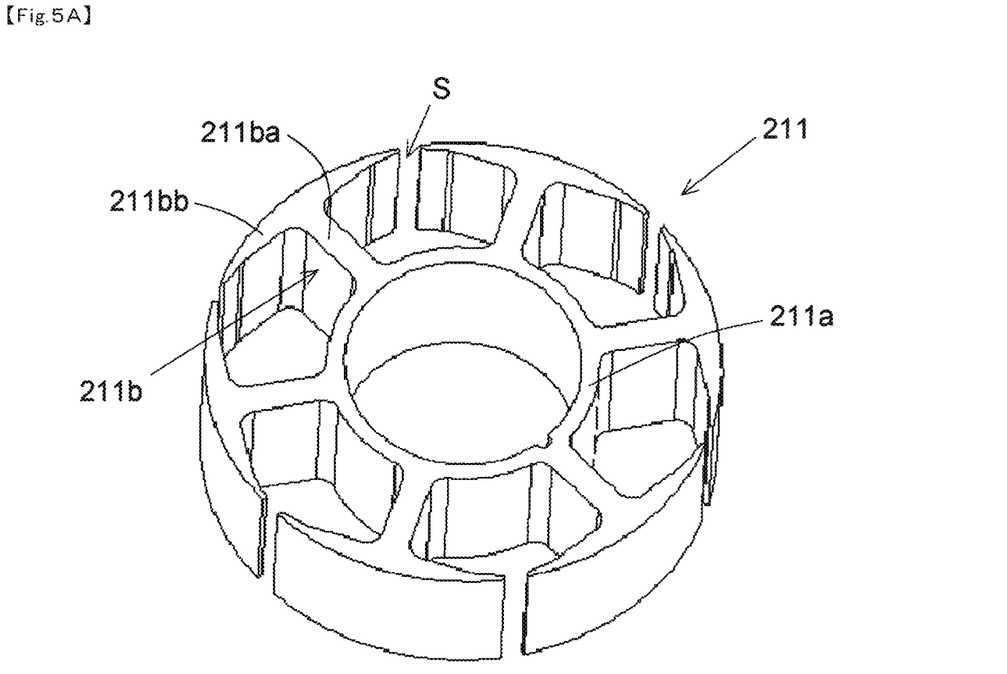
FIG. 5A is a perspective view of a stator core included in the motor according to the first example embodiment of the present disclosure.

The stator core 211 is a magnetic body. For example, the stator core 211 is formed by layering electromagnetic steel plates. The magnet 14 is disposed radially outward of the stator core 211 at an interval in the radial direction. FIG. 5A is a perspective view of the stator core 211 included in the motor 1 according to the first example embodiment of the present disclosure. The stator core 211 includes a core back 211a in an annular shape about the center axis C and a plurality of teeth 211b extending radially outward from the core back 211a. The plurality of teeth 211b is disposed at intervals in the circumferential direction. Specifically, each of the teeth 211b includes a tooth body portion 211ba extending radially outward from the core back 211a, and an umbrella portion 211bb disposed radially outward of the tooth body portion 211ba. The umbrella portion 211bb extends in the circumferential direction. The umbrella portion 211bb includes a portion extending from one circumferential end of the tooth body portion 211ba to one side in the circumferential direction, and another portion extending from the other circumferential end of the tooth body portion 211ba to the other side in the circumferential direction. That is, the umbrella portion 211bb is wider in the circumferential direction than the tooth body portion 211ba. A gap S is circumferentially provided between umbrella portions 211bb adjacent to each other in the circumferential direction.

Figure 5B:
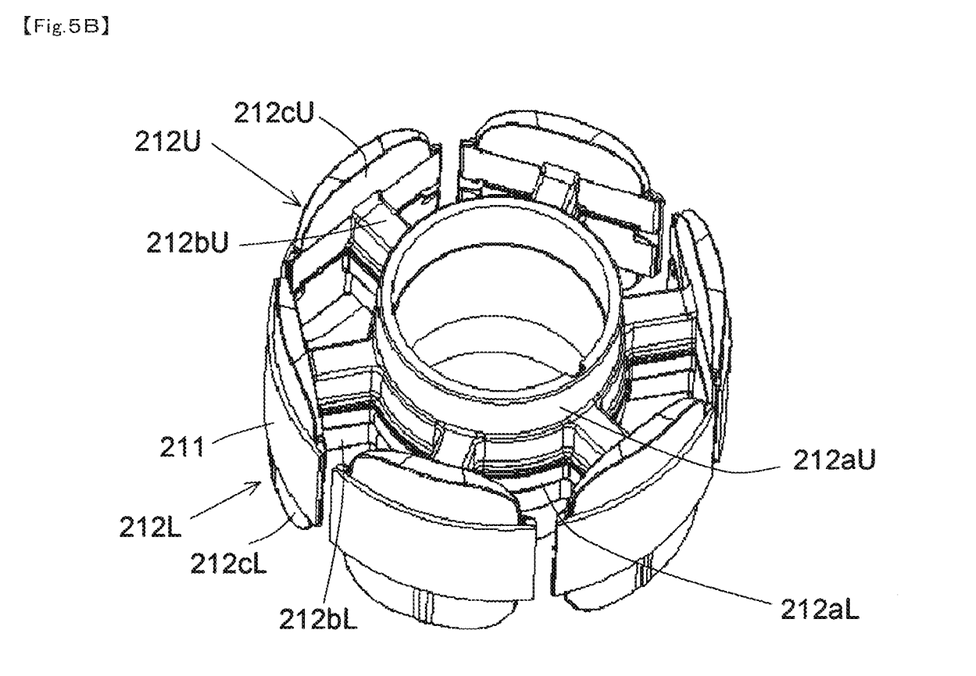
FIG. 5B is a perspective view of the stator core and an insulator included in the motor according to the first example embodiment of the present disclosure.

The insulator 212 is an insulating body. As a material of the insulator 212, for example, resin may be used. At least a part of the stator core 211 is covered with the insulator 212. In the present example embodiment, the stator core 211 is partly covered with the insulator 212. Each of the teeth 211b has a radially outer surface exposed without being covered with the insulator 212. That is, the radially outer surface of each umbrella portion 211bb is exposed without being covered with the insulator 212. The radially outer surface of each of the teeth 211b faces the magnet 14 at an interval in the radial direction. FIG. 5B is a perspective view of the stator core 211 and the insulator 212 included in the motor 1 according to the first example embodiment of the present disclosure. As illustrated in FIG. 5B, the insulator 212 specifically includes an upper insulator 212U disposed axially above the stator core 211 and a lower insulator 212L disposed axially below the stator core 211. The upper insulator 212U includes an upper insulator annular portion 212aU in an annular shape about the center axis C, a plurality of upper insulator radial portions 212bU extending radially outward from the upper insulator annular portion 212aU, and upper insulator circumferential portions 212cU disposed radially outward of the respective upper insulator radial portions 212bU, extending in the circumferential direction. The lower insulator 212L includes a lower insulator annular portion 212aL in an annular shape about the center axis C, a plurality of lower insulator radial portions 212bL extending radially outward from the lower insulator annular portion 212aL, and lower insulator circumferential portions 212cL disposed radially outward of the respective lower insulator radial portions 212bL, extending in the circumferential direction. The upper and lower insulator annular portions 212aU and 212aL are configured to cover a radially outer surface of the core back 211a. The upper and lower insulator radial portions 212bU and 212bL are configured to cover the tooth body portion 211ba. The upper insulator circumferential direction portions 212cU are disposed on the corresponding umbrella portions 211bb and extends axially upward from the corresponding upper insulator radial portions 212bU. The lower insulator circumferential portions 212cL are disposed below the corresponding umbrella portion 211bb and extends axially downward from the corresponding lower insulator radial portions 212bL. The upper and lower insulator circumferential portions 212cU and 212cL are configured to cover a radially inner surface of the umbrella portion 211bb. The coil 213 is formed by winding a conductive wire around each of the teeth 211b with the insulator 212 interposed therebetween. The plurality of teeth 211b is disposed in the circumferential direction. Thus, the stator 21 includes a plurality of coils 213 disposed in the circumferential direction. In the present example embodiment, the number of the coils 213 is six. However, the number of the coils 213 may be other than six. Each coil 213 has radially inner and radially outer surfaces that are all covered with the insulator 212.

The base 22 is disposed axially below the stator 21. In the present example embodiment, the base 22 is made of resin. However, the base 22 may be made of a material other than resin such as metal. The base 22 is provided in its central portion with a base tubular portion 221 about the center axis C, extending in the axial direction. The base 22 is provided in its axially upper surface with a base recess 222 that is recessed downward in the axial direction and that accommodates the circuit board 23.

The circuit board 23 is disposed axially below the stator 21. The circuit board 23 is disposed axially above the base 22. That is, the circuit board 23 is disposed between the stator 21 and the base 22 in the axial direction. The circuit board 23 includes an electric circuit for supplying a drive current to the coil 213. The circuit board 23 has an axially upper surface on which various electric components are mounted. The circuit board 23 is provided with a first circuit board through-hole 23a that passes through the circuit board 23 in the axial direction and through which the base tubular portion 221 passes. The circuit board 23 is also provided with a second circuit board through-hole 23b that passes through the circuit board 23 in the axial direction and through which the conductive member 24 passes.

The conductive member 24 is electrically connected to the coil 213 and the circuit board 23. In the present example embodiment, the conductive member 24 has the shape of a pin extending in the axial direction. Specifically, the conductive member 24 is a terminal pin in a prismatic shape. The conductive member 24 is fixed to the insulator 212. The conductive member 24 is entangled with a conducting wire drawn from the coil 213. The conductive member 24 has an axially lower portion that partly extends axially downward from the circuit board 23 through the second circuit board through-hole 23b. That is, the conductive member 24 includes an extending portion 24a extending axially downward from the circuit board 23. The conductive member 24 is fixed to the circuit board 23 by solder on an axially lower side of the circuit board 23. In the present example embodiment, the stationary part 20 includes a plurality of the conductive members 24. Specifically, four conductive members 24 are provided. However, the number of the conductive members 24 may be changed as appropriate.

The conductive member 24 does not need to have the shape of a pin as long as it has a portion extending in the axial direction, and may be, for example, a flat terminal extending in the axial direction. The conductive member 24 only needs to be electrically connected to the coil 213, and may not be entangled with the conducting wire drawn from the coil 213.

The resin portion 25 is configured to cover at least a part of the stator 21 and the circuit board 23. The resin portion 25 is formed by molding. The resin constituting the resin portion 25 may be, for example, a hot melt resin or the like. In the present example embodiment, the resin constituting the resin portion 25 is poured into the base recessed portion 222 accommodating the circuit board 23 to cover the whole of the circuit board 23. The resin constituting the resin portion 25 is also poured along a shape of a mold temporarily disposed on the axially upper surface of the base 22 during manufacturing to cover almost the whole of the stator 21. In the present example embodiment, the radially outer surface of each of the teeth 211b is exposed without being covered with the resin portion 25. The resin constituting the resin portion 25 is also disposed between the stator 21 and the circuit board 23 in the axial direction and between the circuit board 23 and the base 22 in the axial direction. The resin constituting the resin portion 25 is configured to cover the whole of the conductive member 24. The resin portion 25 is integrally connected as a whole to mechanically connect the base 22 and the stator 21.

The bearing holder 26 has a cylindrical shape about the center axis C. The bearing holder 26 holds the bearing 27 disposed radially inward of the holder. The bearing holder 26 is fitted into the base tubular portion 221 to be fixed to the base 22. The bearing holder 26 is disposed radially inward of the stator core 211. The stator core 211 is fixed to the bearing holder 26. That is, the stator 21 is supported by the base 22.

The bearing 27 is disposed radially outward of the shaft and radially inward of the bearing holder 26 to rotatably support the shaft 11. In the present example embodiment, two bearings 27 are provided, and the two bearings 27 are disposed at an interval in the axial direction. The two bearings 27 are each a ball bearing. However, the bearings 27 may be changed in number and type appropriately. The bearing may be a sleeve bearing, for example.

In the motor 1, supplying a drive current to the coil 213 generates rotational torque between the magnet 14 and the stator 21. This causes the rotor holder 13 to rotate around the stator 21. When the rotor holder 13 rotates, the impeller 2 fixed to the rotor holder 13 also rotates about the center axis C.

The motor 1 of the present example embodiment is an outer rotor type motor in which the magnet 14 constituting the rotating part 10 is disposed radially outward of the stator 21. The present example embodiment enables an outer rotor type motor to be prevented from increasing in axial size, and thus enabling reduction in the amount of the resin constituting the resin portion 25. However, the motor to which the present disclosure is applied may be an inner rotor type motor in which a magnet constituting a rotating part is disposed radially inward of a stator.

As illustrated in FIG. 5, the circuit board 23 has an axially upper surface mounted with an electric element 28 disposed between two coils 213 of the plurality of coils 213, adjacent to each other in the circumference direction. The present example embodiment has a preferred form in which the electric element 28 disposed between the two coils 213 adjacent to each other in the circumference direction, has an axially upper end that is located above an axially lower end of each of the coils 213. Additionally, at least a part of the electric element 28 disposed between the two coils 213 adjacent to each other in the circumference direction, is disposed at a position having a shorter distance from the center axis C than a radially outer end of each of the coils 213. In other words, at least a part of the electric element 28 is located radially inward of the umbrella portion 211bb. The number of electric elements 28 disposed between the two coils 213 adjacent to each other in the circumferential direction may be single or plural.

This structure allows at least a part of the electric element 28 to be disposed in a space inside the stator 21 that has been conventionally filled with resin, so that the amount of the resin filled in the space can be reduced, and thus enabling reduction in the amount of the resin effectively. This structure enables reducing the motor 1 in axial thickness as compared to when the electric element 28 is disposed axially below the coil 213. As a result, the amount of the resin constituting the resin portion 25 can be reduced. When the electric element 28 is disposed radially outward of the stator 21, the motor 1 can be prevented from increasing in axial thickness due to the electric element 28 disposed axially below the coil 213. However, this case also requires the electric element 28 to be covered with the resin, so that the amount of the resin is likely to increase outside the stator 21 in the radial direction.

Electric elements other than the electric element 28 may be disposed on an axially upper surface of the circuit board 23, and these electric elements may be disposed radially outward of the stator 21.

In the present example embodiment, the electric element 28 is a capacitor. The electric element 28 is, for example, a smoothing capacitor. Specifically, the electric element 28 is an electrolytic capacitor. This structure allows the electric element 28, which is likely to be highest in axial height, to be disposed between the two coils 213 adjacent to each other in the circumferential direction in the motor 1, so that the amount of the resin constituting the resin portion 25 can be effectively reduced by reducing the motor 1 in thickness. The electric element 28 may be other than the capacitor. The electric element 28 may be, for example, an inductor such as a choke coil.

In the present example embodiment, the plurality of coils 213 includes a first coil 213a, a second coil 213b, and a third coil 213c. The second coil 213b and the third coil 213c are each adjacent to the first coil 213a. The plurality of coils 213 further includes other three coils 213. These three coils 213 may be changed in number. Specifically, the second coil 213b is disposed adjacent to the first coil 213a on one side in the circumferential direction. The third coil 213c is disposed adjacent to the first coil 213a on the other side in the circumferential direction.

In the present example embodiment, electric elements 28 include a first electric element 28a and a second electric element 28b. The first electric element 28a and the second electric element 28b are the same kind of electric element. Specifically, the first electric element 28a and the second electric element 28b are each a capacitor. However, the first electric element 28a and the second electric element 28b may be different from each other in kind of electric element.

The first electric element 28a is disposed between the first coil 213a and the second coil 213b in the circumferential direction. The second electric element 28b is disposed between the first coil 213a and the third coil 213c in the circumferential direction. Although in the present example embodiment, the first electric element 28a and the second electric element 28b are each provided as the electric element 28 disposed between the two coils 213 adjacent to each other in the circumferential directions, any one of the first electric element 28a and the second electric element 28b may be provided.

Figure 6:
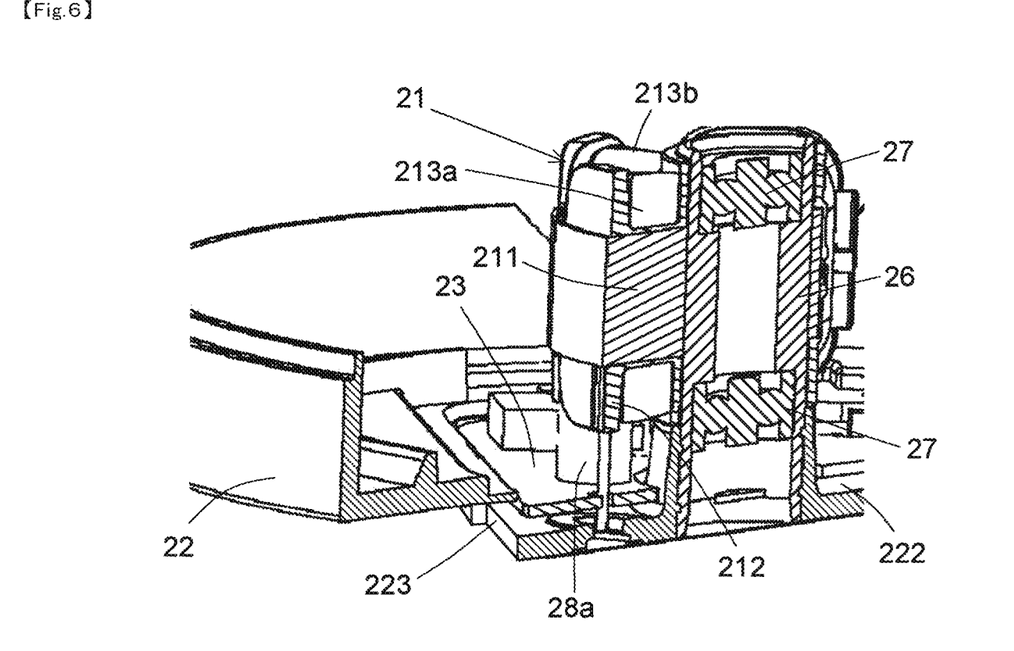
FIG. 6 is a schematic sectional perspective view of the motor according to the first example embodiment of the present disclosure.

FIG. 6 is a schematic sectional perspective view of the motor 1 according to the first example embodiment of the present disclosure. As illustrated in FIG. 6, the base 22 is provided with an injection portion 223 at a position to inject the resin into the base 22 from the outside when the resin portion 25 is formed. The injection portion 223 spatially connects the outside of the base 22 and the base recessed portion 222. In the present example embodiment, the injection portion 223 is a cutout portion formed by cutting out a side wall of the base 22 from an axially lower end of the side wall in an axially upward direction. In the present example embodiment, the resin is injected from the side. The injection portion 223 may be a through-hole instead of the cutout portion.

When the resin portion 25 is formed, for example, molds are disposed above and below the base 22. The mold may be disposed only above the base 22. After an injection of the resin is completed and the mold is removed, an unnecessary resin portion formed during resin molding is removed. In the present example embodiment, a resin portion formed outside the base 22 with respect to the injection portion 223 is the unnecessary resin portion. When this portion is removed, a gate mark 251 (refer to FIG. 8), which is a mark of the gate at the time of molding the resin portion 25, is formed. That is, in the present example embodiment, the gate mark 251 is formed at a position of the injection portion 223. The gate mark 251 is formed on a radially outer surface of the resin portion 25.

FIG. 7 is a view for illustrating a positional relationship between the injection portion 223 and the coil 213 in the motor 1 according to the first example embodiment of the present disclosure. FIG. 7 is a schematic plan view of the stationary part 20 from which the resin portion 25 is removed, as viewed from above in the axial direction. The injection portion 223 is schematically illustrated to facilitate understanding of the disclosure. At least a part of the injection portion 223 is preferably located within an angular range from one circumferential end E3 of the second coil 213b to the other circumferential end E2 of the first coil 213a. At least a part of the injection part 223 is also preferably located within an angular range from one circumferential end E1 of the first coil 213a to the other circumferential end E4 of the third coil 213c.

As described above, the gate mark 251 is formed at the position of the injection portion 223. In other words, in view of this point, at least a part of the gate mark 251 is preferably located within the angular range from the one circumferential end E3 of the second coil 213b to the other circumferential end E2 of the first coil 213a. At least a part of the gate mark 251 is also preferably located within the angular range from the one circumferential end E1 of the first coil 213a to the other circumferential end E4 of the first coil 213a.

That is, at least a part of the gate mark 251 is preferably located within an angular range from one circumferential end of any one of the two coils 213a and 213b (or 213a and 213c) to the other circumferential end of the other thereof. The two coils 213a and 213b (or 213a and 213c) are a set of coils adjacent to each other in the circumferential direction, between which the electric element 28 is circumferentially disposed. According to the present structure, when the resin portion 25 is molded, the electric element 28 disposed between the two coils 213a and 213b (or 213a and 213c) in the circumferential direction is disposed near the gate. Thus, the resin constituting the resin portion 25 can be sufficiently spread even into a narrow gap between the electric element 28 and the coil 213. That is, insulation can be properly secured.

The injection portion 223 preferably overlaps any one of the two coils 213a and 213b (or 213a and 213c) in the radial direction. In other words, the gate mark 251 preferably overlaps any one of the two coils 213a and 213b (or 213a and 213c) in the radial direction. This structure causes the gate to be located at a position displaced in the circumferential direction from the electric element 28 disposed between the two coils 213a and 213b (or 213a and 213c) in the circumferential direction, at the time of molding the resin portion 25, so that the electric element 28 can be prevented from coming off from the circuit board 23 due to a flow of the resin. In the radial direction, a position of the gate, i.e., the gate mark 251 is preferably provided avoiding a position overlapping the gap S. The position of the gate, i.e., the gate mark 251 is preferably not provided not only within an angular range from the other circumferential end of the coil 213b of the two coils 213a and 213b adjacent to each other in the circumferential direction to one circumferential end of the coil 213a thereof, but also within an angular range from the other circumferential end of the coil 213a of the two coils 213a and 213c adjacent to each other in the circumferential direction to one circumferential end of the coil 213c thereof.

In the present example embodiment, the first electric element 28a disposed between the first coil 213a and the second coil 213b in the circumferential direction is provided, and the second electric element 28b disposed between the first coil 213a and the third coil 213c in the circumferential direction is provided. In the structure provided with the first electric element 28a and the second electric element 28b as described above, the injection portion 223 may be located within an angular range from the one circumferential end E3 of the second coil 213b to the other circumferential end E4 of the third coil 213c. This enables the resin to be likely to spread around the first electric element 28a or the second electric element 28b. However, the injection portion 223 more preferably overlaps the first coil 213a in the radial direction. This enables not only the resin to be injected from the vicinity of the first electric element 28a and the second electric element 28b, but also the first electric element 28a and the second electric element 28b to be prevented from coming off from the circuit board 23 due to a flow of the resin that is being injected. Thus, a more preferable form in the present example embodiment is configured such that the gate mark 251 is located within the angular range from the one circumferential end E1 of the first coil 213a to the other circumferential end E2 thereof.

The gate mark 251 may be partly out of the angular range from the one circumferential end E1 of the first coil 213a to the other circumferential end E2 thereof. That is, at least a part of the gate mark 251 may be located within the angular range from the one circumferential end E1 of the first coil 213a to the other circumferential end E2 thereof. Even such a structure enables both the first electric element 28a and the second electric element 28b to be disposed near the gate at the time of molding the resin portion 25, so that the resin can be sufficiently spread into a narrow space between the electric element 28 and the coil 213 for both the first electric element 28a and the second electric element 28b.

When the second electric element 28b of the first electric element 28a and the second electric element 28b is not provided, the gate mark 251 may overlap the second coil 213b instead of the first coil 213a in the radial direction. When the first electric element 28a of the first electric element 28a and the second electric element 28b is not provided, the gate mark 251 may overlap the third coil 213c instead of the first coil 213a in the radial direction.

Figure 8:
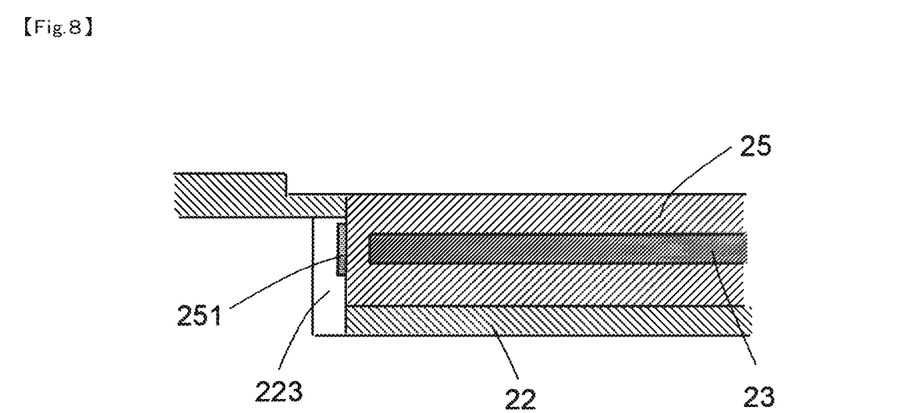
FIG. 8 is a view for illustrating a positional relationship between a gate mark and a circuit board in the motor according to the first example embodiment of the present disclosure.

FIG. 8 is a view for illustrating a positional relationship between the gate mark 251 and the circuit board 23 in the motor 1 according to the first example embodiment of the present disclosure. FIG. 8 is a view illustrating a part of a schematic longitudinal sectional view of the motor 1 in an enlarged manner. As illustrated in FIG. 8, in the present example embodiment, the circuit board 23 is located at an axial height position within a range from an axially upper end of the gate mark 251 to an axially lower end thereof. This structure enables the resin injected from the injection portion 223 to be applied to a lateral surface of the circuit board 23 at the time of molding the resin portion 25, so that the resin can be likely to spread above and below the circuit board 23 in the axial direction.

The whole of the circuit board 23 is not necessarily located at an axial height position within the range from the axially upper end of the gate mark 251 to the axially lower end thereof. At least a part of the circuit board 23 may be located at an axial height position within the range from the axially upper end of the gate mark 251 to the axially lower end thereof. The circuit board 23 may be located at an axial height position that is largely displaced from an axial height position of the gate mark 251.

At least a part of the circuit board 23 preferably overlaps the gate mark 251 in the radial direction. In the present example embodiment, the circuit board 23 overlaps the gate mark 251 in the radial direction. Such a structure enables the resin to be easily applied to the lateral surface of the circuit board 23 when the resin portion 25 is molded, so that the resin can be likely to spread above and below the circuit board 23 in the axial direction. However, the circuit board 23 may not overlap the gate mark 251 in the radial direction. Such a structure may be applied, for example, when the circuit board 23 is not provided throughout the circumference in the circumferential direction.

Figure 9:
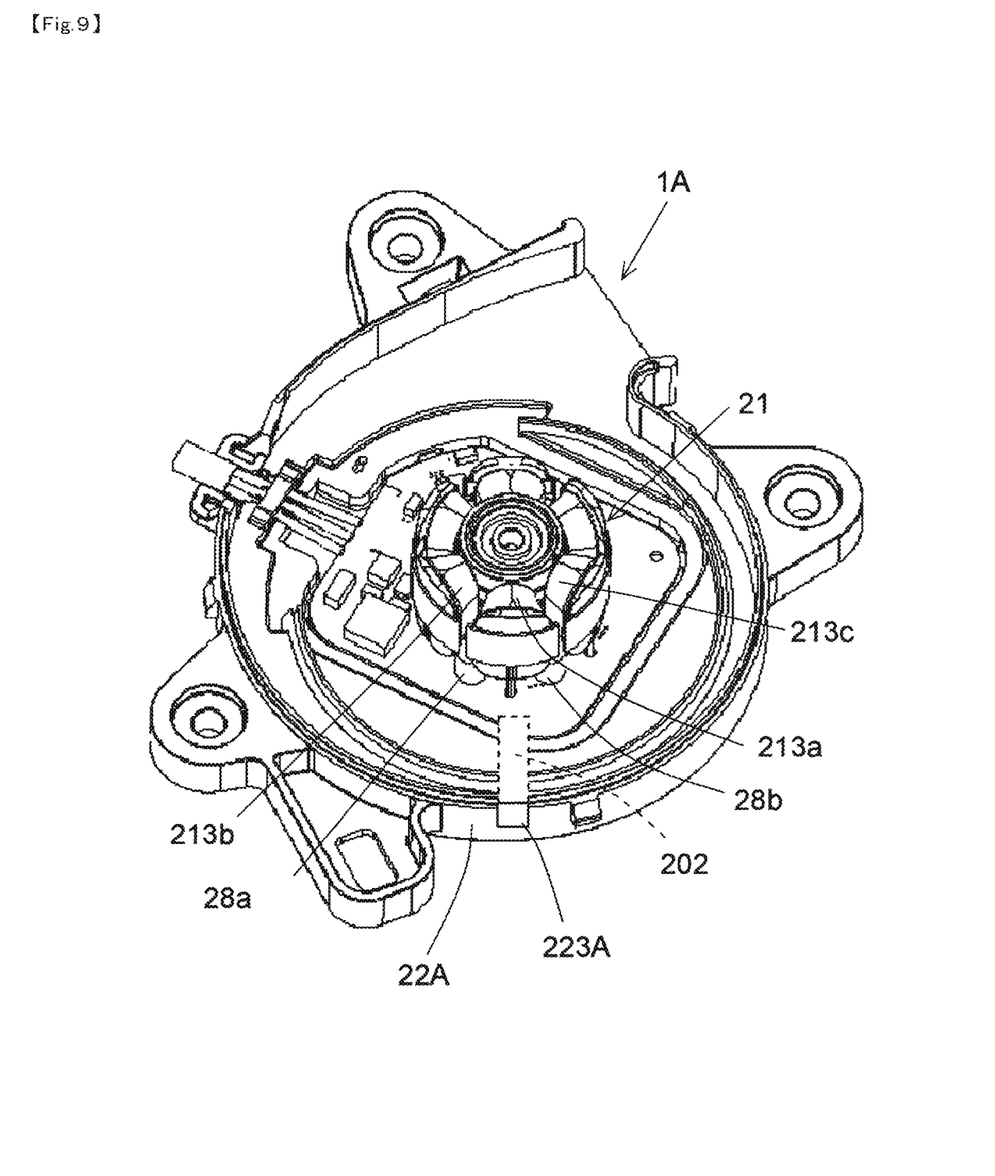
FIG. 9 is a view for illustrating a modification of the motor according to the first example embodiment of the present disclosure.

FIG. 9 is a view for illustrating a modification of a motor 1 according to the first example embodiment of the present disclosure. FIG. 9 is a schematic perspective view of a motor 1A of the modification. However, FIG. 9 illustrates the motor 1A by eliminating a rotating part 10 and a resin portion 25A. FIG. 9 also schematically illustrates a passage 202 formed using a mold 200 disposed at the time of molding the resin portion 25A.

The motor 1A of the modification is different from the above-described example embodiment in position of an injection portion 223A through which resin is injected into a base 22A when the resin portion 25A is molded. The injection portion 223A is a cutout portion formed by cutting out a side wall of the base 22A from an axially upper end of the side wall in an axially downward direction. The injection portion 223A may be a through-hole instead of the cutout portion. Even in the present modification, the resin is injected from the side. The injection portion 223A is located within an angular range from one circumferential end of a first coil 213a to the other circumferential end thereof.

Figure 10:
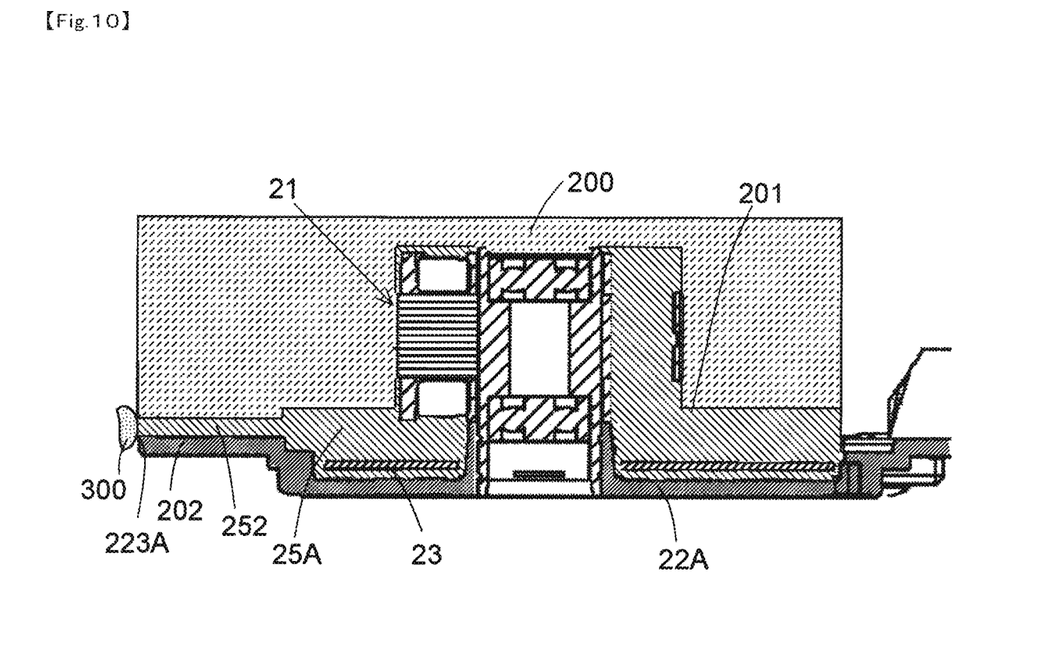
FIG. 10 is a schematic longitudinal sectional view illustrating a state during molding of a resin portion in the motor of the modification.

FIG. 10 is a schematic longitudinal sectional view illustrating a state during molding of the resin portion 25A in the motor 1A of the modification. The mold 200 is disposed axially above the base 22A. A mold also may be disposed axially below the base 22A, if necessary. The resin is injected from a molding machine nozzle 300 disposed laterally through the injection portion 223A. The mold 200 is provided, in front of a molding portion 201, with the passage 202 for carrying the resin injected through the injection portion 223 to the molding portion 201 for forming the resin portion 25A. The passage 202 is a portion including a so-called gate.

Figure 11:
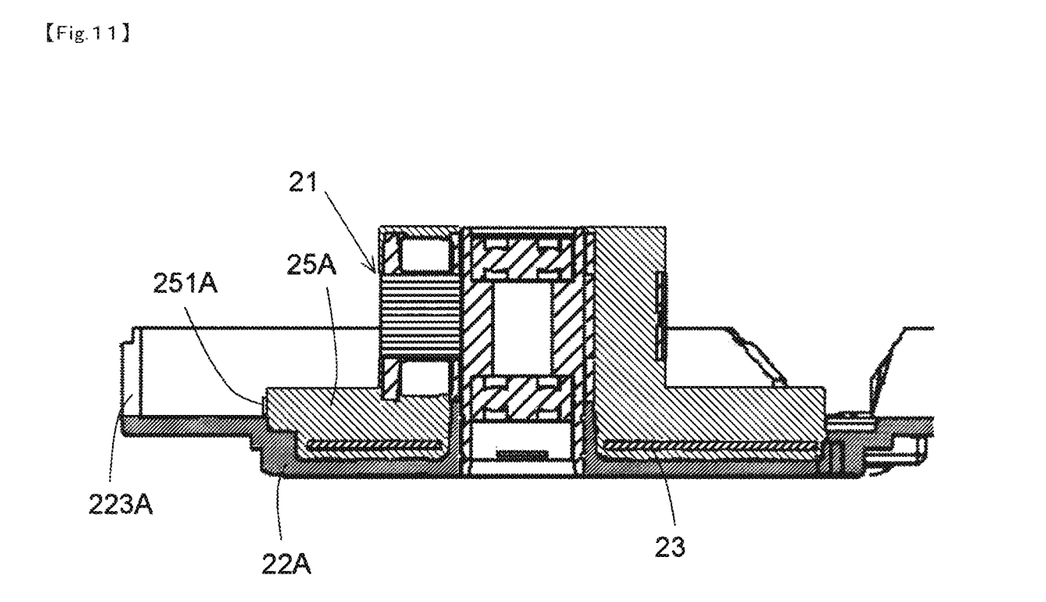
FIG. 11 is a view illustrating a state in which a mold and an unnecessary portion of resin are removed from the state of FIG. 10.

FIG. 11 is a view illustrating a state in which the mold 200 and an unnecessary portion 252 of resin are removed from the state of FIG. 10. The resin portion 25A is configured to cover at least a part of the stator 21 and the circuit board 23. The unnecessary portion 252 is a resin filled in the passage 202 illustrated in FIG. 10. When the unnecessary portion 252 is removed, a gate mark 251A is formed on an outer surface of the resin portion 25A.

In the present modification, the gate mark 251A is formed at a position away from a position of the injection portion 223A. However, the present modification is also configured as in the above-described example embodiment such that at least a part of the gate mark 251A is located within the angular range from the one circumferential end E1 of the first coil 213a to the other circumferential end E2 thereof. Thus, the present modification also has the gate provided near each of the electric elements 28a and 28b, so that the resin forming the resin portion 25A can be sufficiently spread into a narrow gap between the electric element 28 and the coil 213. That is, insulation can be properly secured. Additionally, when the resin portion 25A is molded, the electric elements 28a and 28b can be prevented from coming off from the circuit board 23 due to a flow of the resin.

As long as the gate mark 251A is disposed at a position near the electric element 28, the injection portion 223A may be changed in position from the position in the modification. For example, the position of the injection portion 223A may be displaced from the position where the gate mark 251A is formed when viewed in the radial direction. The injection portion 223A may be provided at an axial height position displaced from an axial height position where the gate mark 251A is formed.

A motor 1B of a second example embodiment will be described. The motor 1B of the second example embodiment is configured almost as in the first example embodiment. In the description of the second example embodiment, the same parts as those in the first example embodiment are designated by the same reference numerals, and duplicated description thereof will be eliminated unless it is particularly necessary. In the description of the second example embodiment, parts different from those in the first example embodiment will be mainly described.

Figure 12:
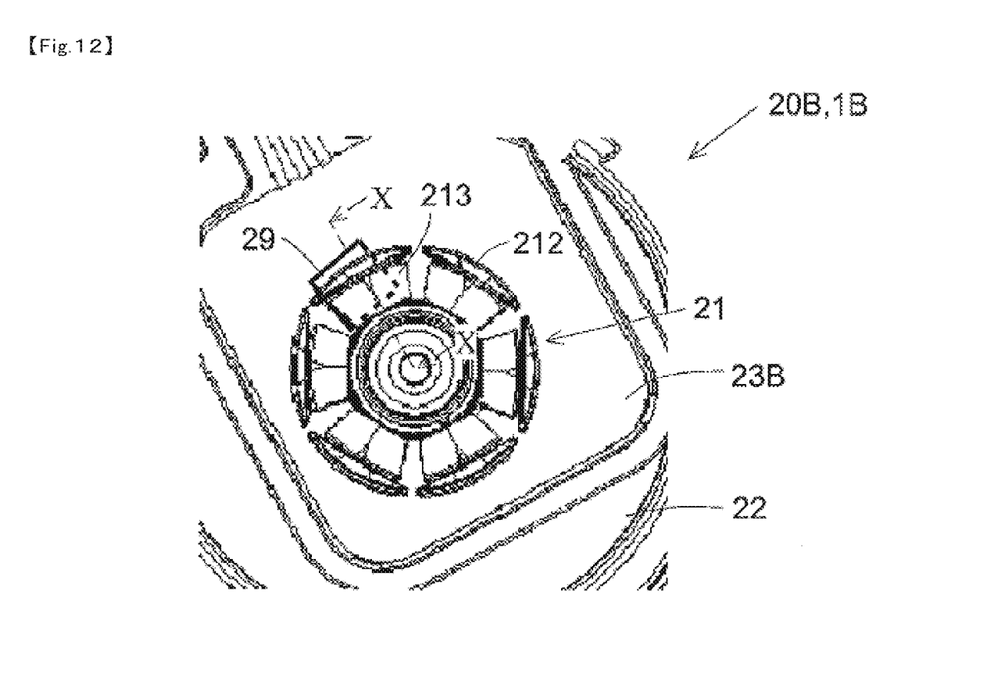
FIG. 12 is a schematic plan view illustrating a structure of a part of a stationary part of a motor according to a second example embodiment of the present disclosure.
Figure 13:
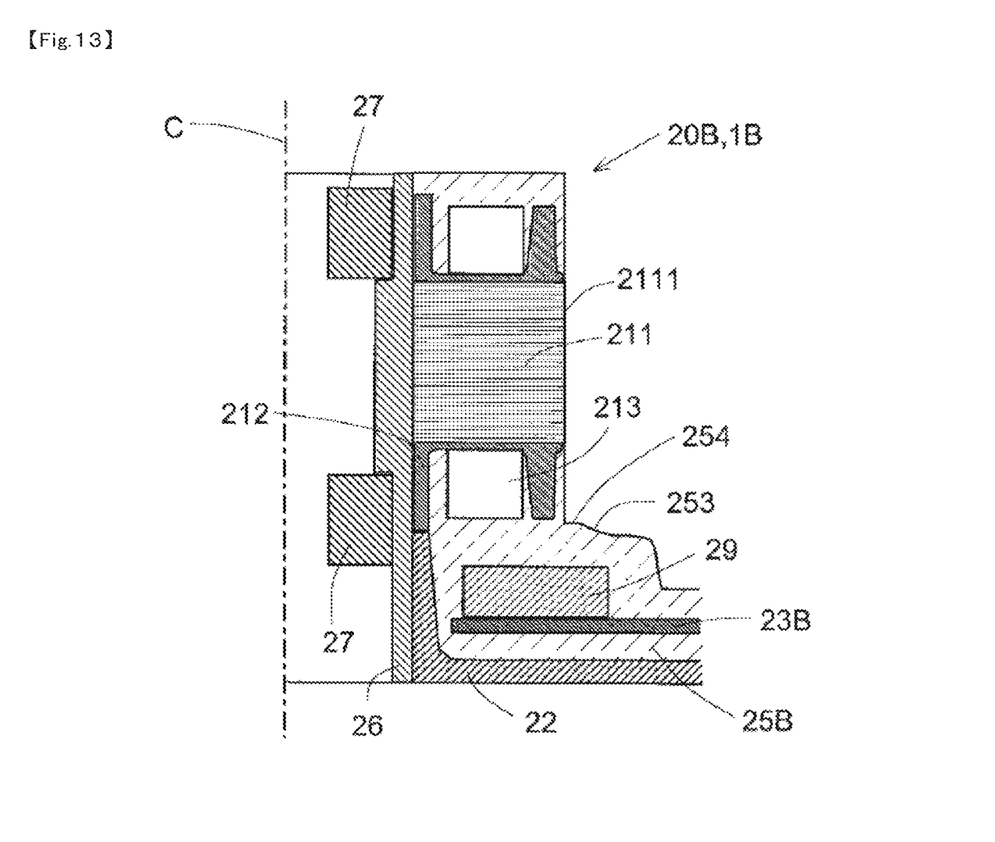
FIG. 13 is a schematic sectional view illustrating the structure of the part of the stationary part of the motor according to the second example embodiment of the present disclosure.

FIG. 12 is a schematic plan view illustrating a structure of a part of a stationary part 20B of the motor 1B according to the second example embodiment of the present disclosure. However, a resin portion 25B constituting the stationary part 20B is eliminated in FIG. 12. FIG. 13 is a schematic sectional view illustrating a structure of a part of the stationary part 20B of the motor 1B according to the second example embodiment of the present disclosure. FIG. 13 is a schematic sectional view taken along line X-X in FIG. 12. However, FIG. 13 illustrates also the resin portion 25B constituting the stationary part 20B. FIGS. 12 and 13 each illustrate only an electric element (third electric element) 29 of electric elements mounted on a circuit board 23B, which is characteristic in the motor 1B of the second example embodiment. The electric element 29 is different from the electric element 28 shown in the first example embodiment.

As in the first example embodiment, a stator 21 of the second example embodiment includes a stator core 211 having teeth 211b around each of which a conductive wire constituting a coil 213 is wound.

As illustrated in FIGS. 12 and 13, the electric element 29 disposed below the coil 213 is mounted on an axially upper surface of the circuit board 23B in the second example embodiment. The present example embodiment allows a part of the electric element 29 to be disposed below the coil 213. However, the electric element 29 may be wholly disposed below the coil 213. That is, at least a part of the electric element 29 may be disposed below the coil 213.

Specifically, the electric element 29 is partially disposed between two adjacent coils 213 in the circumferential direction. The present example embodiment allows the electric element 29 to have an axial height smaller than an axial distance from the circuit board 23B to each of the coils 213. Thus, to be more precise, a part of the electric element 29 is disposed between the two adjacent coils 213 in the circumferential direction in plan view from the axial direction. The electric element 29 is also partially disposed radially outward of a radially outer end of each of the coils 213. More specifically, the electric element 29 is partially disposed radially outward of a radially outer end 2111 of the stator core 211.

The electric element 29 may be wholly disposed between two adjacent coils 213 in the circumferential direction. The electric element 29 also may include a portion disposed between the two adjacent coils 213 in the circumferential direction, and a remaining portion disposed radially outward of each of the coils 213.

As described above, the circuit board 23B has an axially upper surface mounted with the electric element 29 that is disposed at least at one of positions including a position between two coils 213 of the plurality of coils 213, adjacent to each other in the circumference direction, and a position below each of the coils 213. Such a structure allows the electric element 29 to be disposed radially inward of the radially outer end 2111 of the stator core 211. This allows at least a part of the electric element 29 to be disposed in a space which is conventionally filled only with resin, so that the amount of filling of resin can be reduced. Additionally, the resin portion 25B covering the electric element 29 from above can be increased in thickness on at least a part of the electric element 29 without being hindered by a member constituting the rotating part 10 like the rotor holder 13. This enables strength of the resin portion 25B of the motor 1 to be secured.

The electric element 29 of the present example embodiment has an axial height smaller than an axial distance from the circuit board 23 to the coil 213 in the first example embodiment. This enables the electric element 29 to be disposed below the coil 213 while maintaining an axial distance between the circuit board 23B and the coil 213 as in the first example embodiment. The electric element 29 is, for example, an inductor serving as a filter that removes noise. However, the electric element 29 may be other than the inductor.

Figure 14:
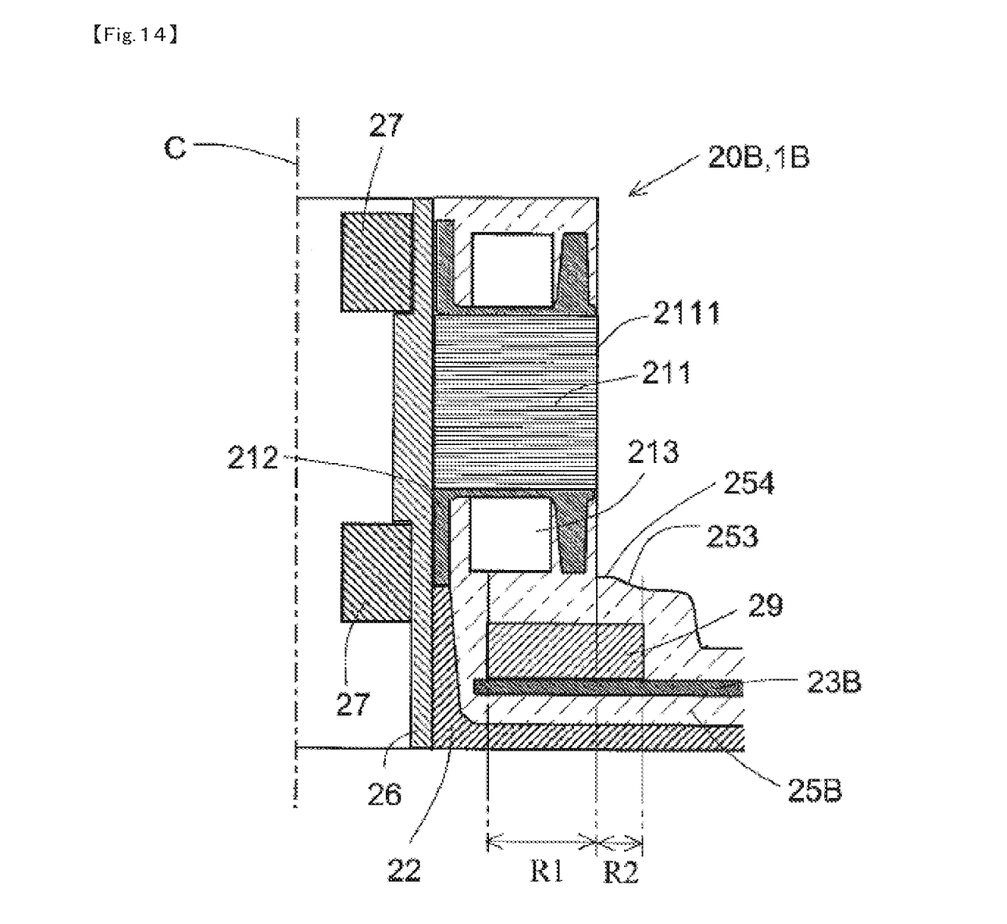
FIG. 14 is a diagram for illustrating a relationship between an electric element and a stator core included in the motor according to the second example embodiment of the present disclosure.

FIG. 14 is a diagram for illustrating a relationship between the electric element 29 and the stator core 211 included in the motor 1B according to the second example embodiment of the present disclosure. FIG. 14 is a diagram in which lines and symbols indicating a positional relationship are added to FIG. 13. As illustrated in FIG. 14, the electric element 29 has a first region R1 and a second region R2 in the present example embodiment. The first region R1 is located radially inward of the radially outer end 2111 of the stator core 211. The second region R2 is located radially outward of the radially outer end 2111 of the stator core 211.

The first region R1 has a larger area than the second region R2 in plan view from the axial direction. That is, the present example embodiment allows more than half of the electric elements 29 to be located radially inward of the radially outer end 2111 of the stator core 211 in plan view from the axial direction. Such a structure enables many portions of the electric element 29 to be disposed below the stator core 211, so that the amount of usage of resin can be reduced. The many portions thereof can be disposed below the stator core 211, so that the resin portion 25B covering the electric element 29 from above can be likely to be increased in thickness while avoiding interference with members constituting the rotating part 10 like the rotor holder 13. The electric element 29 preferably has a region as large as possible that is disposed radially inward of the radially outer end 2111 of the stator core 211.

The resin portion 25B existing between the first region R1 and the coil 213 in the axial direction has a maximum axial thickness larger than a maximum axial thickness of the resin portion 25B existing on the second region R2. This structure enables the resin portion 25B covering the electric element 29 from above to have a thicker thickness than when the electric element 29 is wholly disposed at the radially outer end of the stator core 211, so that strength of the resin portion 25B can be secured. A maximum thickness means a thickness of the thickest portion. The maximum axial thickness of the resin portion 25B means an axial height of a portion of the resin portion 25B, having the highest axial height.

The coil 213 has a lower end increasing in height in the axial direction as the lower end is away from the tooth 211b, around which the coil 213 is wound, in the circumferential direction. That is, the lower portion of the coil 213 has a curved structure projecting downward in the axial direction when viewed in plan view from the radial direction. Thus, when the electric element 29 is disposed below the coil 213, the resin portion 25B covering the electric element 29 from above can be increased in thickness particularly on a circumferential end side of the coil 213.

As illustrated in FIGS. 13 and 14, the resin portion 25 existing on the second region R2 includes an inclined portion 253 having an axial thickness decreasing radially outward in the present example embodiment. The inclined portion 253 may be a flat surface or a curved surface. Such a structure enables the resin portion 25B covering the electric element 29 from above to have an axial thickness as much as possible while avoiding contact with a member constituting the rotating part 10 radially outward of the stator core 211.

More specifically, the resin portion 25 existing on the second region R2 includes a flat portion 254 and the inclined portion 253 in order radially outward in the present example embodiment. The flat portion 254 has a constant thickness in the resin portion 25 existing on the second region R2. A connecting portion between the flat portion 254 and the inclined portion 253 preferably has a curved shape. The flat portion 254 may not be provided. However, the flat portion 254 is preferably provided to increase the thickness of the resin portion 25B as much as possible while avoiding contact with an element constituting the rotating part 10.

To avoid contact with an element constituting the rotating part 10, the resin portion 25B may have a step structure including the flat portion 254 and another flat portion connected to a wall surface extending axially downward from a radially outer end of the flat portion 254. However, the structure provided with the inclined portion 253 as in the present example embodiment is preferable because the structure facilitates avoiding formation of a sharp corner portion where a stress is likely to concentrate.

Various technical features disclosed in the present specification can be variously modified without departing from the gist of the technical creation. Additionally, the plurality of example embodiments and modifications shown in the present specification may be combined and implemented as far as possible.

The present disclosure can be used for, for example, a cooling fan for vehicles, home appliances, office equipment, and the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotating portion rotatable about a center axis that extends vertically; and
a stationary portion that rotatably supports the rotating portion;
the stationary portion including:
a stator facing at least a part of the rotating portion in a radial direction;
a circuit board disposed axially below the stator; and
a resin portion covering at least a portion of the stator, and the circuit board;
the stator including a plurality of coils disposed in a circumferential direction; and
the circuit board including an axially upper surface mounted with an electric element disposed at a position between two coils of the plurality of coils which are adjacent to each other in the circumferential direction.

2. The motor according to claim 1, wherein at least a portion of a gate mark that is a mark of a gate at the time of molding the resin portion, is located within an angular range from one circumferential end of any one of two coils of the plurality of coils to the other circumferential end of the other of the two coils.

3. The motor according to claim 2, wherein the gate mark overlaps any one of the two coils in the radial direction.

4. The motor according to claim 2, wherein the circuit board is located at an axial height position within a range from an axially upper end of the gate mark to an axially lower end of the gate mark.

5. The motor according to claim 4, wherein at least a portion of the circuit board overlaps the gate mark in the radial direction.

6. The motor according to claim 2, wherein the plurality of coils includes:
a first coil;
a second coil disposed adjacent to the first coil on one side in the circumferential direction; and
a third coil disposed adjacent to the first coil on the other side in the circumferential direction;
the electric element is one of electric elements including:
a first electric element disposed between the first coil and the second coil in the circumferential direction; and
a second electric element disposed between the first coil and the third coil in the circumferential direction; and
at least a portion of the gate mark is located within an angular range from one circumferential end of the first coil to the other circumferential end of the first coil.

7. The motor according to claim 1, wherein the electric element disposed between the two coils in the circumferential direction is a capacitor.

8. The motor according to claim 1, wherein
the stator includes a stator core including teeth around each of which a conductive wire defining the coil is wound;
the electric element includes:
a first region that is radially inward of a radially outer end of the stator core; and
a second region that is radially outward of the radially outer end of the stator core; and
the first region has a larger area than the second region in plan view from an axial direction.

9. The motor according to claim 8, wherein
the electric element is partially disposed below the coil; and
the resin portion between the first region and the coil in the axial direction has a maximum axial thickness larger than a maximum axial thickness of the resin portion on the second region.

10. The motor according to claim 8, wherein the resin portion on the second region includes an inclined portion with an axial thickness decreasing radially outward.

11. The motor according to claim 1, wherein the rotating portion includes:
a rotor holder including a side wall portion radially outward of the stator; and
a magnet disposed on the side wall portion.

12. A blower comprising:
the motor according to claim 1; and
an impeller rotatable together with the rotating portion.

* * * * *